United States Patent
Nakamura et al.

(10) Patent No.: US 9,409,553 B2
(45) Date of Patent: Aug. 9, 2016

(54) CONTROL DEVICE FOR WORK VEHICLE (71) Applicant: Hitachi Construction Machinery Co., Ltd., Bunkyo-ku, Tokyo (JP)

(72) Inventors: Yuta Nakamura, Tsuhiura (JP); Katsuaki Kodaka, Tsuchiura (JP); Masahiro Kayane, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 46 days.

(21) Appl. No.: 14/373,504

(22) PCT Filed: Jan. 18, 2013

(86) PCT No.: PCT/JP2013/050974
§ 371 (c)(1),
(2) Date: Jul. 21, 2014

(87) PCT Pub. No.: WO2013/108888
PCT Pub. Date: Jul. 25, 2013

(65) Prior Publication Data
US 2015/0032337 A1  Jan. 29, 2015

(30) Foreign Application Priority Data
Jan. 19, 2012 (JP) .................. 2012-009248

(51) Int. Cl.
*B60T 7/04* (2006.01)
*B60T 13/66* (2006.01)
(Continued)

(52) U.S. Cl.
CPC . *B60T 7/045* (2013.01); *B60T 8/17* (2013.01); *B60T 8/326* (2013.01); *B60T 13/168* (2013.01);
(Continued)

(58) Field of Classification Search
CPC ....... E02F 9/2253; E02F 9/226; E02F 9/2292; E02F 9/2012; E02F 9/20–9/2004; E02F 9/2025; E02F 9/2029; E02F 9/2058; E02F 9/2083; E02F 9/22–9/2203; E02F 9/2246; E02F 9/2278; B60T 8/17; B60T 13/662; B60T 13/686; B60T 13/168; B60T 7/04; B60T 7/045–7/047; B60T 7/08; B60T 8/1701; B60T 8/32; B60T 8/3255–8/326; B60T 8/50; B60T 8/58–8/72; B60T 13/10; B60T 13/16; B60T 13/66; F16D 55/24
USPC ........ 701/50, 48, 70; 303/121, 138, 157, 158, 303/167, 89
See application file for complete search history.

(56) References Cited

U.S. PATENT DOCUMENTS

| 4,220,050 A | * | 9/1980 | Friesen | .................. | B60K 28/04 200/558 |
| 4,254,845 A | * | 3/1981 | Braun | ....................... | B60T 1/08 180/244 |

(Continued)

FOREIGN PATENT DOCUMENTS

| EP | 2 208 630 A1 | 7/2010 |
| JP | 9-24807 A | 1/1997 |

(Continued)

OTHER PUBLICATIONS

International Search Report dated Feb. 26, 2013 with English translation (five (5) pages).

(Continued)

*Primary Examiner* — Bao Long T Nguyen
(74) *Attorney, Agent, or Firm* — Crowell & Moring LLP (57) ABSTRACT

A control device for work vehicle includes: a hydraulic brake device that generates a braking force according to operation of a brake pedal upon traveling; a brake lock device that hydraulically locks the hydraulic brake device and unlocks hydraulic lock of the hydraulic brake device; a brake pedal operation detection unit that detects the operation of the brake pedal; a hydraulic lock directing switch that is provided on a manual operating lever for operating a work device of the work vehicle; and a control unit that controls the brake lock device such that when the hydraulic lock directing switch is operated, the hydraulic brake device is hydraulically locked and when a predetermined depression operation of the brake pedal is detected by the brake pedal operation detection unit, the hydraulic lock of the hydraulic brake device is unlocked.

3 Claims, 4 Drawing Sheets (51) Int. Cl.
  *B60T 13/68* (2006.01)
  *E02F 9/22* (2006.01)
  *B60T 13/16* (2006.01)
  *F16D 55/24* (2006.01)
  *B60T 8/17* (2006.01)
  *B60T 8/32* (2006.01)
  *G05G 9/047* (2006.01)
  *E02F 9/20* (2006.01)

(52) U.S. Cl.
  CPC ............ *B60T 13/662* (2013.01); *B60T 13/686* (2013.01); *E02F 9/2012* (2013.01); *E02F 9/226* (2013.01); *E02F 9/2253* (2013.01); *E02F 9/2292* (2013.01); *F16D 55/24* (2013.01); *G05G 9/047* (2013.01)

(56) References Cited

U.S. PATENT DOCUMENTS

| | | | | |
|---|---|---|---|---|
| 4,516,469 | A * | 5/1985 | Sato | E02F 3/961 60/422 |
| 4,969,527 | A * | 11/1990 | Boe | A01B 63/1117 172/2 |
| 5,307,631 | A * | 5/1994 | Tatsumi | E02F 9/2228 60/452 |
| 6,135,230 | A * | 10/2000 | Schenck | B60K 28/04 180/269 |
| 7,757,486 | B2 * | 7/2010 | Ichimura | E02F 9/2246 180/272 |
| 8,328,296 | B2 * | 12/2012 | Kodaka | B60G 17/005 188/265 |
| 2004/0255706 | A1 | 12/2004 | Bulgrien | |
| 2006/0042857 | A1 * | 3/2006 | Catton | B60N 2/4693 180/334 |
| 2006/0095186 | A1 * | 5/2006 | Hendron | E02F 3/384 701/50 |
| 2008/0184841 | A1 * | 8/2008 | Blind | A01B 63/00 74/491 |
| 2008/0303342 | A1 | 12/2008 | Kodaka et al. | |
| 2009/0260901 | A1 * | 10/2009 | Ishii | A01D 34/78 180/6.5 |
| 2009/0326770 | A1 * | 12/2009 | O'Neil | B60T 7/12 701/54 |
| 2010/0016123 | A1 | 1/2010 | Kodaka et al. | |
| 2011/0036674 | A1 | 2/2011 | Kodaka et al. | |
| 2011/0300992 | A1 * | 12/2011 | Richter | B60T 7/12 477/186 |

FOREIGN PATENT DOCUMENTS

| | | |
|---|---|---|
| JP | 11-348744 A | 12/1999 |
| JP | 2006-7849 A | 1/2006 |
| JP | 2007-1327 A | 1/2007 |
| JP | 2007-71135 A | 3/2007 |
| JP | 2008-149802 A | 7/2008 |
| WO | WO 01/47738 A1 | 7/2001 |

OTHER PUBLICATIONS

Extended European Search Report issued in counterpart European Application No. 13738180.2 dated Jan. 7, 2016 (Eight (8) pages).

* cited by examiner

CONTROL DEVICE FOR WORK VEHICLE

TECHNICAL FIELD

The present invention relates to a control device for a work vehicle that controls operation of a hydraulic brake that is provided in a wheeled excavator or the like.

BACKGROUND ART

Generally, a work vehicle such as a wheeled excavator is provided with a service braking device that provides a braking force when a brake pedal is operated to drive a brake valve. The service braking device can be used as a work braking device upon working. In this case, the service braking device is continuously operated by the operation of a brake switch. That is, the service braking device is hydraulically locked. This type of braking device is disclosed in, for example, the following prior art reference (cf., Patent Document 1).

CITATION LIST

Patent Literature

Patent Document 1: Japanese Laid Open Patent Publication No. 2006-7849

SUMMARY OF INVENTION

Technical Problem

However, in the work vehicle described in the above patent document, when the brake is to be hydraulically locked, the operator must remove his or her hand from the operating lever before actuating the brake switch or the operator must depress the brake pedal deeper than otherwise. For this reason, in the case of works in which working such as excavation and traveling are alternately repeated frequently, brake lock operations for actuating the service braking device are cumbersome and undesirable. In addition, when working such as excavation and traveling are alternately repeated frequently without hydraulically locking the brake, the brake pedal must be continuously depressed during the working such as excavation. This is troublesome.

Solution to Problem

A control device for work vehicle according to a first aspect of the present invention comprises: a hydraulic brake device that generates a braking force according to operation of a brake pedal upon traveling; a brake lock device that hydraulically locks the hydraulic brake device and unlocks hydraulic lock of the hydraulic brake device; a brake pedal operation detection unit that detects the operation of the brake pedal; a hydraulic lock directing switch that is provided on a manual operating lever for operating a work device of the work vehicle; and a control unit that controls the brake lock device such that when the hydraulic lock directing switch is operated, the hydraulic brake device is hydraulically locked and when a predetermined depression operation of the brake pedal is detected by the brake pedal operation detection unit, the hydraulic lock of the hydraulic brake device is unlocked.

According to a second aspect of the present invention, in the control device for work vehicle according to the first aspect, it is preferable that the control unit controls the brake lock unit such that even when the hydraulic lock directing switch is operated after the hydraulic brake device is hydraulically locked, the hydraulic lock of the hydraulic brake device is not unlocked.

According to a third aspect of the present invention, the control device for work vehicle according to the first or second aspect may further comprise: an accelerator pedal operation detection unit that detects operation of an accelerator pedal, and it is preferable that the control unit invalidates operation of the hydraulic lock directing switch when the accelerator pedal operation detection unit detects that the accelerator pedal is operated.

According to a fourth aspect of the present invention, the control device for work vehicle according to the third aspect may further comprise: a speed detection unit that detects a traveling speed of the work vehicle, and it is preferable that when the hydraulic lock directing switch is operated, the control unit controls the brake lock unit such that a braking force generated by the hydraulic brake device becomes greater as the traveling speed detected by the speed detection unit becomes lower.

Advantageous Effect of Invention

According to the present invention, the operability of a work vehicle can be improved even when working such as excavation and traveling are alternately repeated frequently.

DESCRIPTION OF EMBODIMENTS

Figure 1:
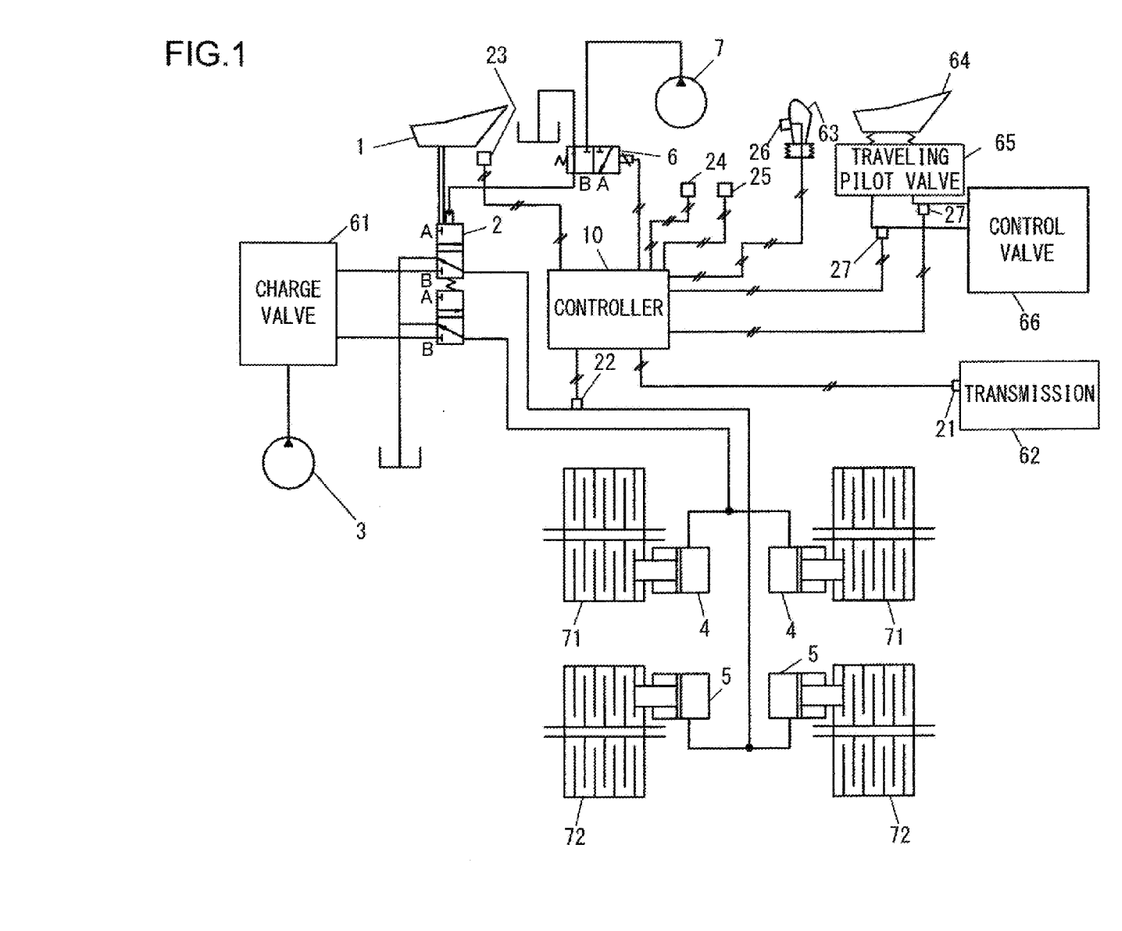
FIG. 1 presents a hydraulic circuit diagram showing an overall configuration of a control device according to an embodiment of the present invention.

Referring to FIGS. 1-4, an embodiment of a control device for a work vehicle according to the present invention is explained. The control device according to the present embodiment controls a hydraulic brake device. FIG. 1 presents a hydraulic circuit diagram showing an overall configuration of the control device according to the present embodiment. The hydraulic brake device is a service braking device, which is provided in a work vehicle that is equipped with tires and travels on open roads, for example, a wheeled excavator, and which generates braking force according to an amount of operation of a brake pedal 1 upon traveling. In FIG. 1, a brake valve 2 controls hydraulic oil that is delivered from a gear pump 3 to brake cylinders 4, 5 for driving front and rear brake discs 71, 72, respectively. The brake valve 2 has change-over positions A and B. The change-over position is changed over from the change-over position A to the change-over position B according to the operation of depressing the brake pedal 1. The change-over position A is an operational position at which the hydraulic oil discharged from the gear pump 3 is delivered to the brake cylinders 4, 5 through a charge valve 61 to actuate the brake. The change-over position B is an operational position at which the brake is released by communicating the braking cylinders 4, 5 with a tank. The amount of change-over of the brake valve 2 increases according to the amount of depression of the brake pedal 1 and the brake force increases therewith. Therefore, strokes of the brake cylinders 4, 5 drive the brake discs 71, 72 to provide brake force with which the vehicle is stopped or decelerated. Note that the brake cylinders 4, 5 are brake cylinders for the front and rear wheels, respectively.

The brake valve 2 is configured such that it is mechanically actuated by the brake pedal 1 and has a pilot port as well, through which hydraulic oil is delivered to change over the change-over position from the change-over position B to the change-over position A. The pilot port is connected to a pilot hydraulic pressure source (gear pump 7) or a tank through a brake control electromagnetic valve 6. The brake control electromagnetic valve 6 has a change-over position A at which the pilot port of the brake valve 2 is connected with the gear pump 7 and a change-over position B at which the pilot port is connected with the tank. The brake control electromagnetic valve 6 is changed over between the change-over positions A and B based on a signal from a control device (controller) 10 described later, that is, a brake control electromagnetic valve output signal described later.

When the brake control electromagnetic valve 6 is changed over to the change-over position B, the pilot port of the brake valve 2 has a pressure that is equal to the pressure in the tank and the brake valve 2 is shifted to the change-over position B to unlock the brake lock, resulting in that the brake is brought into a state or condition (hereafter, simply referred to state) in which the brake can be operated by operating the brake pedal 1. On the other hand, when the brake control electromagnetic valve 6 is changed over to the change-over position A, the hydraulic oil from the gear pump 7 is delivered to the pilot port of the brake valve 2 to change over the brake valve 2 to the change-over position A, resulting in that the brake is actuated without operating the brake pedal 1. This state is referred to as "hydraulic lock state" or "brake lock state" of the service braking device. The state in which the service braking device is hydraulically locked and operates continuously is an activated state of the work braking device. By controlling the change-over amount of the brake control electromagnetic valve 6 from the change-over position B to the change-over position A, the pressure of the hydraulic oil delivered to the pilot port of the brake valve 2 can be controlled to adjust braking force.

Figure 2:
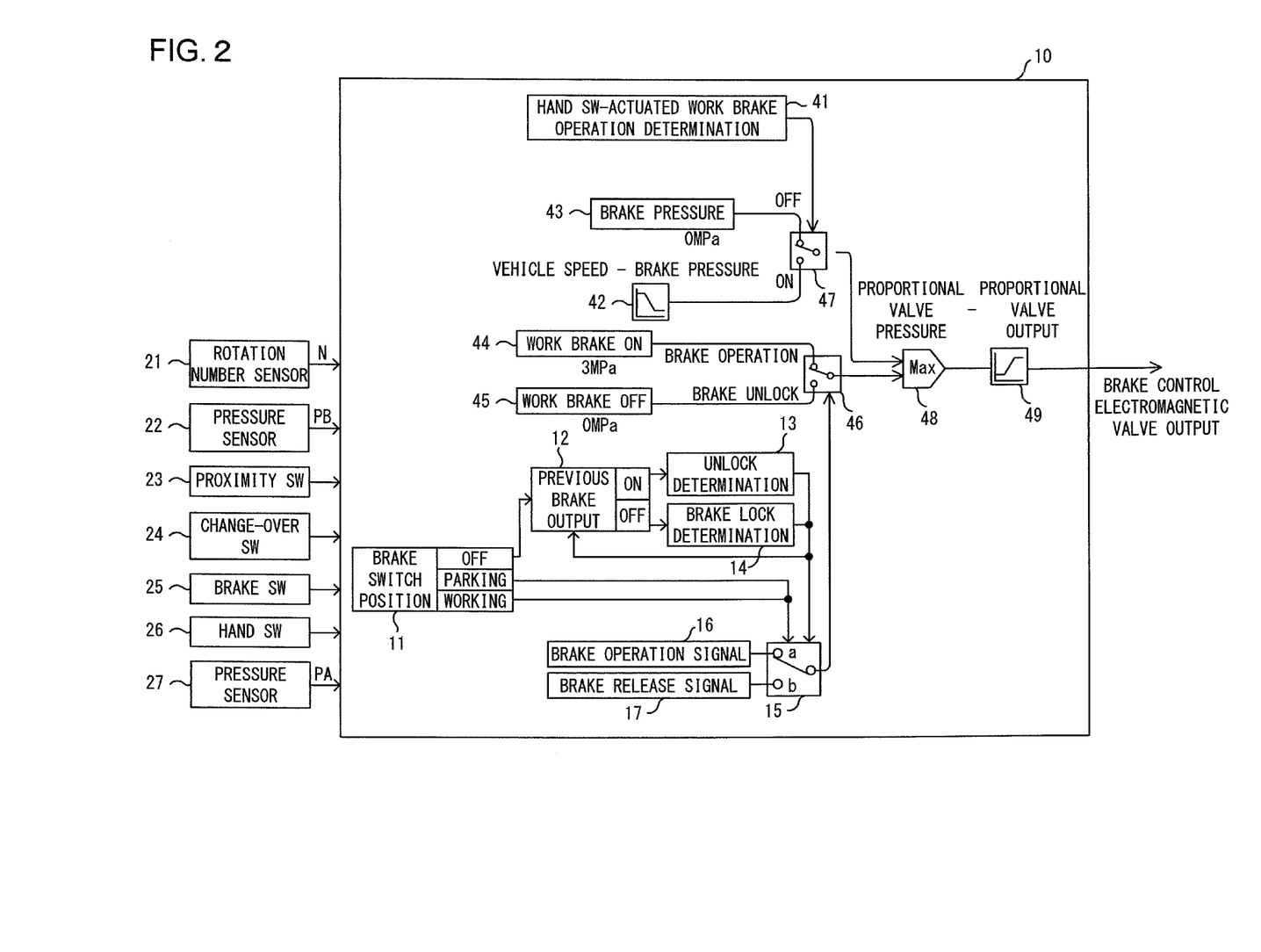
FIG. 2 presents a block diagram showing a configuration of a controller.
Figure 3:
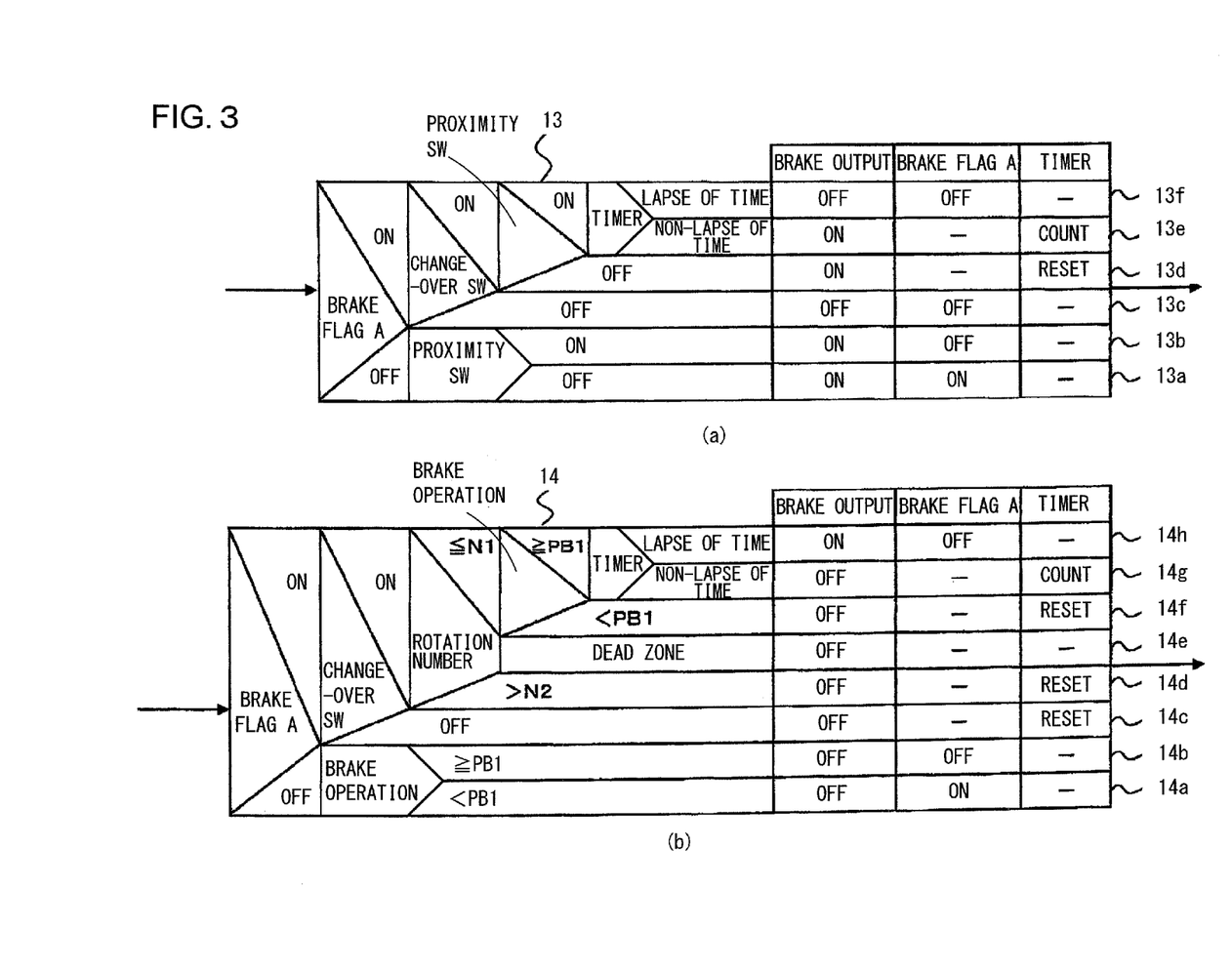
FIG. 3(a) presents a block diagram showing details of processing in an unlock determination circuit.
FIG. 3(b) presents a block diagram showing details of processing in a brake lock determination circuit.

FIG. 2 presents a block diagram showing a configuration of the controller 10. As shown in FIGS. 1 and 2, a rotation number sensor 21, a pressure sensor 22, a proximity switch 23, a change-over switch 24, a brake switch 25, a work braking actuation switch (hand switch) 26, and a pressure sensor 27 are each connected to the controller 10. The rotation number sensor 21 is a sensor that detects or counts the number of rotations N of a transmission 62, which number has a correlation with vehicle speed. The pressure sensor 22 is a pressure sensor that detects pressure that is exerted on the brake cylinders 4, 5, i.e., an operation pressure PB of the brake pedal 1. The proximity switch 23 is a proximity switch that is provided below the brake pedal 1 and detects a depressing operation of the brake pedal 1 in an amount not smaller than a predetermined amount. The change-over switch 24 is a change-over switch that is operated by the operator in order to select whether brake lock is to be performed automatically or manually.

The brake switch 25 is a switch that is operated by the operator in order to select activation or inactivation of a parking brake device and select activation or inactivation of a work braking device. The park braking device is a braking device that is activated while the vehicle is parking. The park braking device is constituted by a transmission in which both a low speed gear and a high speed gear are meshed or by a negative braking device separately provided. The work braking device is a braking device that hydraulically locks the service braking device without operating the brake pedal 1 as mentioned above. The hand switch 26 is an operational switch that is operated by the operator in order to issue an instruction to activate the work braking device as described below. The hand switch 26 is provided at a position at which the operator can operate it without removing his or her hand from an operating lever 63 for operating a working device (working actuator) such as an arm or bucket in the case of the wheeled excavator. For example, the hand switch 26 is attached to the operating lever 63. Note that the hand switch 26 need not necessarily be provided at the operating lever 63 as far as it can be provided at a position at which the operator can operate it with the operating lever 63 being grabbed by him or her or otherwise at a position at which the operator can operate it by displacing his or her hand that grabs the operating lever 63 to a certain extent from the operating lever 63.

The pressure sensor 27 is a pressure sensor that detects a pilot pressure PA, which is controlled by a traveling pilot valve 65 according to the operation of depressing a traveling pedal (accelerator pedal) 64 of the work vehicle. The pilot pressure PA that is controlled by the traveling pilot valve 65 is delivered to a pilot port of a control valve 66. Note that in the work vehicle according to the present embodiment, the hydraulic oil from a hydraulic pump (not shown) that is driven by an engine (not shown) is delivered through a counter balance valve (not shown) to a traveling hydraulic motor (not shown), with its direction and flow rate being controlled by the control valve 66, to drive the wheels.

The proximity switch 23 is turned on when the brake pedal 1 is depressed to a maximal extent and turned off when the operation of depressing to a maximal extent is stopped. The change-over switch 24 is turned on when it is changed over to an automatic position and turned off when it is changed over to a manual position. The brake switch 25 can be changed over to any one of an off position, a parking position and a working position. When the brake switch is changed over to the off position, the work braking device (FIG. 1) and the park braking device (not shown) are inactivated. On the other hand, when the brake switch is changed over to the parking position, the park braking device is activated and when it is changed over to the working position, the work braking device is activated. The hand switch 26 is turned on when it is operated and turned off when it is ceased to be operated.

Signals from respective sensors 21, 22 and 27 and respective switches 23 to 26 are input into the controller 10. A brake switch change-over position determination circuit 11 of the controller 10 determines the change-over position of the brake switch 25. When the brake switch 25 is changed over to the off position, the work braking operation determination processing described later is performed in a hand switch 26-actuated work brake operation determination circuit 41, which determines work braking that is actuated by the hand switch 26. When the brake switch 25 is changed over to the off position, a previous brake output determination circuit 12 determines whether a previous brake output is on or off. This determination is performed based on a signal from an unlock determination circuit 13 and a signal from a brake lock determination circuit 14. If the previous brake output is determined to be off, the brake lock determination processing described later is performed in the brake lock determination circuit 14, while if it is determined to be on, the unlock determination processing described later is performed in the unlock determination circuit 13. Note that the previous brake output determination circuit 12, when the off signal is issued from the work brake operation determination circuit 41, will not perform determination as to whether the previous brake output is on or off. The work brake operation determination circuit 41, when a brake operation signal is issued from an output circuit 16 through a change-over circuit 15, will not perform the work braking operation determination processing described later.

In the change-over circuit 15, a switch is changed over to the position a or position b according to the signals from the brake switch 25 and the determination circuits 13 and 14. That is, when the brake switch 25 is at the off position and an on signal is output from the determination circuit 13 or 14, the switch of the change-over circuit 15 is changed over to the position a, while the switch is changed over to the position b when the off signal is output from the determination circuit 13 or 14. When the brake switch 25 is changed over to the parking position, the switch of the change-over circuit 15 is changed over to the position b regardless of the signals from the determination circuits 13 and 14. On the other hand, when the brake switch 25 is changed over to the working position, the switch of the change-over circuit 15 is changed over to the position a regardless of the signals from the determination circuits 13 and 14. When the switch of the change-over circuit 15 is changed over to the position a, a brake operation signal is output from the output circuit 16. On the other hand, when the switch of the change-over circuit 15 is changed over to the position b, a brake release signal is output from an output circuit 17.

In a change-over circuit 46, a switch is changed over to a brake operation position or a brake release position according to the brake operation signal or the brake release signal that is output through the change-over circuit 15. That is, when the brake operation signal that is output from the output circuit 16 is input into the change-over circuit 46, the change-over circuit 46 changes over the switch to the brake operation position. When the brake release signal that is output from the output circuit 17 is input into the change-over circuit 46, the change-over circuit 46 changes over the switch to the brake release position.

When the switch of the change-over circuit 46 is changed over to the brake operation position, a brake control pilot pressure signal is output from an output circuit 44. This brake control pilot pressure signal is used to generate a set pilot pressure for changing over the brake valve 2 to the change-over position A by means of the brake control electromagnetic valve 6. The set pilot pressure of the brake control pilot pressure signal output from the output circuit 44 is a pressure that is necessary for hydraulic locking, for example, 3 Mpa.

When the switch of the change-over circuit 46 is changed over to the brake release position, a brake control pilot pressure signal is output from the output circuit 45. This brake control pilot pressure signal is used to generate a set pilot pressure for changing over the brake valve 2 to the change-over position B by means of the brake control electromagnetic valve 6. The set pilot pressure of the brake control pilot pressure signal that is output from the output circuit 45 is 0 Mpa. The brake control pilot pressure signal that is output through the change-over circuit 46 is input into a Max determination circuit 48 described later.

In a change-over circuit 47, a switch is changed over to an on position or an off position in response to a signal from the work brake operation determination circuit 41.

That is, when the brake switch 25 is at the off position and an on signal is output from the work brake operation determination circuit 41, the switch of the change-over circuit 47 is changed over to the on position. On the other hand, when an off signal is output from the work brake operation determination circuit 41, the switch is changed over to the off position.

When the switch of the change-over circuit 47 is changed over to the on position, a brake control pilot pressure signal is output from an output circuit 42. The brake control pilot pressure signal is used to control the brake control pilot pressure to a set pilot pressure according to the speed of the work vehicle by means of the brake control electromagnetic valve 6. The output circuit 42 outputs a brake control pilot pressure signal according to the rotation number N of the transmission 62 detected by the rotation number sensor 21, which is set such that the smaller the rotation number N of the transmission 62 is (that is, the lower the vehicle speed is), the higher the set pilot pressure is. That is, the output circuit 42 stores therein a relationship between the rotation number N and the set pilot pressure, with the relationship being set appropriately so that the lower the vehicle speed is, the higher the brake pressure is. When the switch of the change-over circuit 47 is changed over to the off position, a brake control pilot pressure signal, which signal is to control the brake control pilot pressure to a set pilot pressure by means of the brake control electromagnetic valve 6, is output from an output circuit 43. The set pilot pressure of the brake control pilot pressure signal that is output from the output circuit 43 is 0 Mpa. That is, the brake control pilot pressure signal for changing over the brake control electromagnetic valve 6 to the change-over position B is output from the output circuit 43. The brake control pilot pressure signal that is output through the change-over circuit 47 is input into the Max determination circuit 48.

The Max determination circuit 48 outputs one of the brake control pilot pressure signal, which is output through the change-over circuit 46, and the brake control pilot pressure signal, which is output through the change-over circuit 47, having a higher set pilot pressure than the other, to a brake control electromagnetic valve control signal output circuit 49. The brake control electromagnetic valve control signal output circuit 49 outputs a brake control electromagnetic valve output signal to the brake control electromagnetic valve 6 based on the set pilot pressure of the input brake control pilot pressure signal. That is, the brake control electromagnetic valve control signal output circuit 49 stores therein a relationship between the pressure at the brake control electromagnetic valve (proportional valve) 6 and output, and a current value Ia of the brake control electromagnetic valve output signal is set to a current value according to the set pilot pressure. This allows the brake control pilot pressure to be controlled to a predetermined set pilot pressure by means of the brake control electromagnetic valve 6.

FIG. 3(a) presents a block diagram showing details of the processing in the unlock determination circuit 13. FIG. 3(b) is a block diagram showing details of the processing in the brake lock determination circuit 14. As shown in FIG. 3(b), the brake lock determination circuit 14 outputs a brake on signal or a brake off signal based on on/off of brake flag A, on/off of the change-over switch 24, the rotation number N of the transmission, an operation pressure PB of the brake pedal 1, and a measured time of a timer. That is, when the brake flag A is off and the brake operation pressure PB is below a predetermined value PB1, a brake off signal is output and the brake flag A is turned on (14a). The predetermined value PB1 corresponds to an operation pressure when the brake pedal 1 is depressed to a maximal extent. When the brake flag A is off and the brake operation pressure PB is equal to or higher than the predetermined value PB1, a brake off signal is output and the brake flag A is turned off (14b). The brake flag A is to prevent, when the brake is in a hydraulically locked or unlocked state as a result of operation of the brake pedal 1, the brake from being brought into an unintentionally unlocked or locked state again due to continued operation of the brake pedal 1. Details thereof are described later.

When the brake flag A is on and the change-over switch 24 is off (manual), or when the change-over switch 24 is on (automatic) and the rotation number N is greater than a predetermined value N2, a brake off signal is output and the timer is reset (14c, 14d). When the brake flag A is on and the change-over switch 24 is on, if the rotation number N is greater than a predetermined value N1 and is equal to or smaller than the predetermined value N2, a brake off signal is output (14e). Note that the predetermined value N1 corresponds to the vehicle speed when the vehicle travels at a low speed (for example, about 5 km/h) and the predetermined value N2 corresponds to the vehicle speed when the vehicle travels at a speed higher than the low speed (for example, about 10 km/h). When the brake flag A is on and the change-over switch 24 is on, and the rotation number N is equal to or smaller than the predetermined value N1 and the brake operation pressure PB is below the predetermined value PB1, a brake off signal is output and the timer is reset (14f). When the brake flag A is on, the change-over switch 24 is on, the rotation number N is equal to or smaller than the predetermined value N1 and the brake operation pressure PB is equal to or higher than the predetermined value PB1, a brake off signal is output and the timer is activated (14g). Then, when time lapses with this state being continued for a predetermined time, a brake on signal is output and the brake flag A is turned off (14h).

As shown in FIG. 3(a), the unlock determination circuit 13 outputs a brake on signal or a brake off signal according to the on/off of the brake flag A, on/off of the change-over switch 24, on/off of the proximity switch 23, and a measured time of the timer. That is, when the brake flag A is off and the proximity switch 24 is off, a brake on signal is output and the brake flag A is turned on (13a). When the brake flag A is off and the proximity switch 24 is on, a braking on signal is output to and the brake flag A is turned off (13b).

When the brake flag A is on and the change-over switch 24 is off, a brake off signal is output and the brake flag A is turned off (13c). When the brake flag A is on, the change-over switch 24 is on and the proximity switch 23 is off, a brake on signal is output and the timer is reset (13d). When the brake flag A is on, the change-over switch 24 is on, and the proximity switch 23 is on, a brake on signal is output and the timer is activated (13e). Then, if time lapses with this state being continued for a predetermined time, a brake off signal is output and the brake flag A is turned off (13f).

Figure 4:
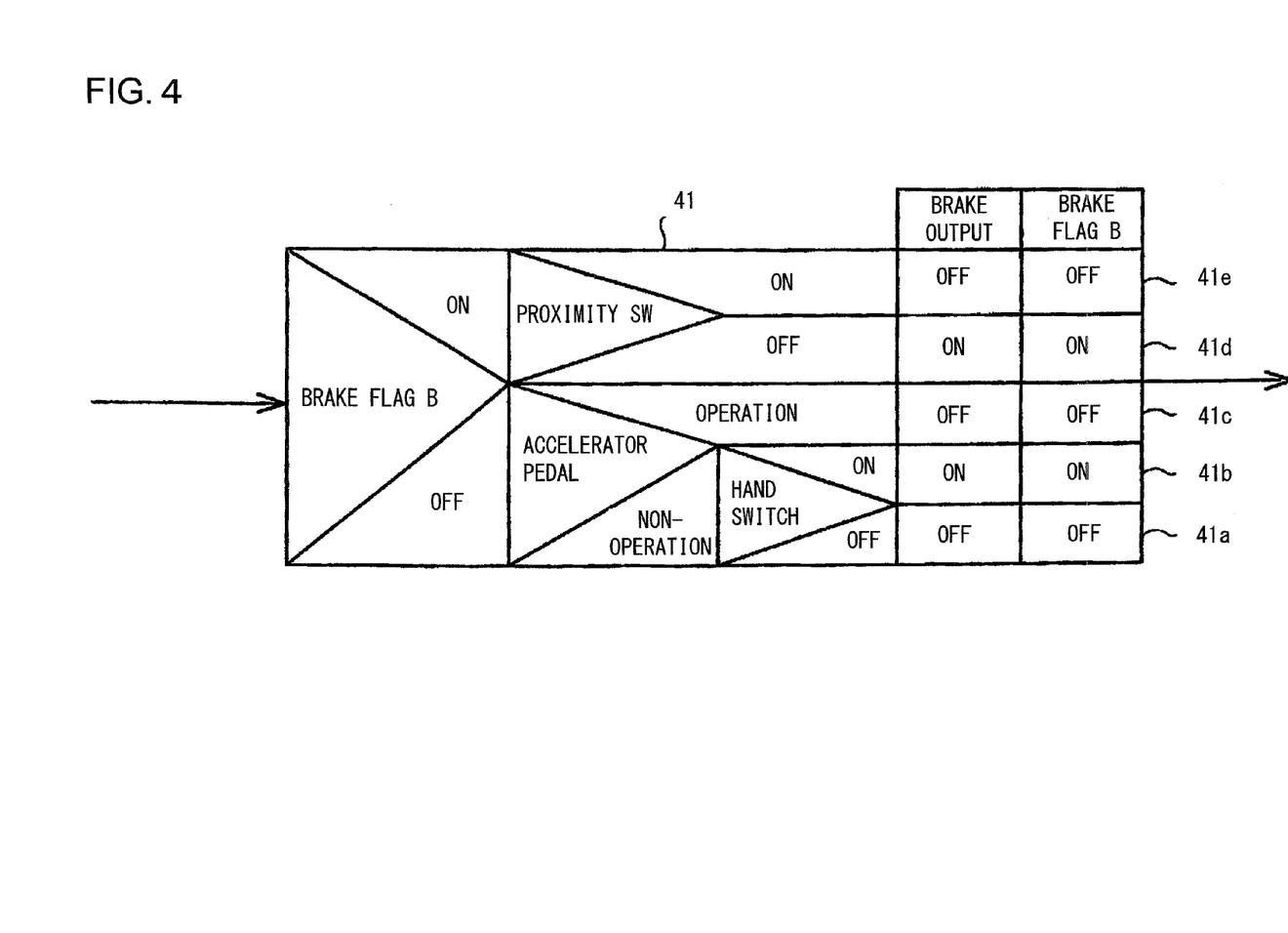
FIG. 4 presents a block diagram showing details of processing in service braking actuation determination processing in a service braking actuation determination circuit.

FIG. 4 presents a block diagram showing details of the work braking operation determination processing in the work brake operation determination circuit 41. As shown in FIG. 4, the work brake operation determination circuit 41 outputs an on signal or an off signal according to on/off of the brake flag B, on/off of the proximity switch 23, operation/non-operation of the accelerator pedal 64, and on/off of the hand switch 26. That is, when the brake flag B is off, the accelerator pedal 64 is not operated, and the hand switch 26 is off, an off signal is output and the brake flag B is turned off (41a). The operation/non-operation of the accelerator pedal 64 is determined by detecting with the pressure sensor 27 a pilot pressure PA that is controlled by the traveling pilot valve 65 according to the depression operation of the accelerator pedal 64.

When the brake flag B is off, the accelerator pedal 64 is not operated, and the hand switch 26 is on, an on signal is output and the brake flag B is turned on (41b). The brake flag B is used for maintaining the hydraulically locked condition or state of the brake once the brake is brought into a state that it is hydraulically locked by operation of the hand switch 26. Also, the brake flag B is used for determining whether to unlock the hydraulically locked state of the brake according to the operation of the brake pedal 1.

When the brake flag B is off and the accelerator pedal is operated, an off signal is output and the brake flag B off is turned off (41c).

When the brake flag B is on and the proximity switch 23 is off, an on signal is output and the brake flag B is turned on (41d). When the brake flag B is on and the proximity switch 23 is on, an off signal is output and the brake flag B is turned off (41e).

Then, major operations of the control device according to the present embodiment are explained. First, a state where the brake is not hydraulically locked (unlock) (for example, a state in which the key switch is turned on but the engine has yet to start to be driven (non-driven state); also, the brake flag A is off), the off signal mentioned above is output from the work brake operation determination circuit 41, and the brake flag B is off is explained as an initial state. When the brake is to be hydraulically locked in this state, the processing shown in FIG. 3(b) is followed. In the initial state, the brake flag A is off and if the brake pedal 1 is not operated yet, the brake operation pressure PB is below the predetermined value PB1. As a result, a brake off signal is output and the brake flag A is turned on (14a). In this initial state, even if the brake pedal 1 was operated, such a state is before the engine was driven yet, so that no brake operation pressure PB is established and the state of (14a) is selected. Note that the state of (14b) is provided for the following reason. That is, if the operation of the brake pedal 1 is continued after the hydraulic lock of the brake mentioned below is unlocked (13f) while the engine is driving, hydraulic lock could occur again due to continued operation of the brake pedal 1. The state of (14b) is provided in order to prevent this. Details thereof are explained later.

When the engine is driven in the initial state and ordinary traveling is to be performed in this state, the change-over switch 24 is changed over to the manual position and the brake switch 25 is changed over to the off position. This allows the brake lock determination circuit 14 to output a brake off signal and the timer to be reset (14c). Then, a brake unlock signal is output from the output circuit 17 of the controller 10. This allows a brake control pilot pressure signal having a set pilot pressure of 0 Mpa to be output from the output circuit 45 through the change-over circuit 46. As mentioned above, the work brake operation determination circuit 41 is in a state where it outputs an off signal and hence a brake control pilot pressure signal having a set pilot pressure of 0 Mpa is output through the change-over circuit 43. Therefore, the Max determination circuit 48 outputs a brake control pilot pressure signal having a set pilot pressure of 0 Mpa to the brake control electromagnetic valve control signal output circuit 49. The brake control electromagnetic valve control signal output circuit 49 outputs a brake control electromagnetic valve output signal having a set pilot pressure of 0 Mpa to the brake control electromagnetic valve 6.

This allows the brake control electromagnetic valve 6 to be changed over to the change-over position B. As a result, the brake lock (operation of the work braking device) is unlocked since no pilot pressure is exerted on the brake valve 2. On this occasion, the brake valve 2 is changed over to the side of the change-over position A according to the amount of operation of the brake pedal 1 so that a service brake can be operated. In case of ordinary traveling or the like where automatic control of the work braking device is not performed, the brake lock determination circuit 14 is in a state of (14*c*).

When the parking brake device is to be operated, the brake switch 25 is changed over to the parking position. This causes the switch of the change-over circuit 15 to be forcibly changed over to the position b and a brake release signal is output from the output circuit 17 of the controller 10. As a result, in the same manner as the case mentioned above, the operation of the work braking device is released. Then, the park braking device (not shown) is operated or activated.

In case the work braking device is to be operated manually, the brake switch 25 is changed over to the work position. This causes the switch of the change-over circuit 15 to be forcibly changed over to the position a, and a brake operation signal is output from the output circuit 16 of the controller 10. Therefore, a brake control pilot pressure signal having a set pilot pressure of 3 Mpa is output from the output circuit 44 through the change-over circuit 46. As mentioned above, the work brake operation determination circuit 41 is in a state where it outputs an off signal and hence a brake control pilot pressure signal having a set pilot pressure of 0 Mpa is output from the output circuit 43 through the change-over circuit 47. Therefore, the Max determination circuit 48 outputs a brake control pilot pressure signal having a set pilot pressure of 3 Mpa to the brake control electromagnetic valve control signal output circuit 49. The brake control electromagnetic valve control signal output circuit 49 outputs a brake control electromagnetic valve output signal having a set pilot pressure of 3 Mpa to the brake control electromagnetic valve 6.

This allows the brake control electromagnetic valve 6 to exert a pilot pressure of 3 Mpa on the brake valve 2 to activate the work braking device. The operation of the parking braking device is inactivated.

On the other hand, when the work braking device is to be automatically controlled, the change-over switch 24 is changed over to the automatic position. As mentioned above, the brake flag A is turned on in (14*a*). In this state, if the change-over switch 24 is turned on, any one of the states (14*h*) to (14*d*) is selected according to the rotation number N and the operation state of the brake pedal 1 (PB). Then, if the brake pedal 1 has not been depressed to a maximal extent, any one of the states (14*f*) to (14*d*) is selected depending on the rotation number N and in each case a brake off signal is output. This causes the switch of the change-over circuit 15 to be changed over to the position b and a brake release signal is output from the output circuit 17 of the controller 10. Therefore, a brake control pilot pressure signal having a set pilot pressure of 0 Mpa is output from the output circuit 45 through the change-over circuit 46. As mentioned above, the work brake operation determination circuit 41 is in a state where it outputs an off signal and hence a brake control pilot pressure signal having a set pilot pressure of 0 Mpa is output from the change-over circuit 43 through the change-over circuit 47. Therefore, the Max determination circuit 48 outputs a brake control pilot pressure signal having a set pilot pressure of 0 Mpa to the brake control electromagnetic valve control signal output circuit 49. The brake control electromagnetic valve control signal output circuit 49 outputs a brake control electromagnetic output signal having a set pilot pressure of 0 Mpa to the brake control electromagnetic valve 6.

This allows the brake control electromagnetic valve 6 to be changed over to the change-over position B. As a result, the brake valve 2 is changed over to the change-over position B and the operation of the work braking device is canceled. Then, when the rotation number N is equal to or smaller than N1 and the brake pedal 1 is depressed to a maximal extent, the timer is activated (14*g*), and if time lapses with the depressed state being continued for a predetermined time, a brake on signal is output and the brake flag A is turned off (14*h*). This causes the switch of the change-over circuit 15 to be changed over to the position a, and a brake operation signal is output from the output circuit 16 of the controller 10. As a result, a brake control pilot pressure signal having a set pilot pressure of 3 Mpa is output from the output circuit 44 through the change-over circuit 46. As mentioned above, the work brake operation determination circuit 41 is in a state where it outputs an off signal and hence a brake control pilot pressure signal having a set pilot pressure of 0 Mpa is output from the output circuit 43 through the change-over circuit 47. Therefore, the Max determination circuit 48 outputs a brake control pilot pressure signal having a set pilot pressure of 3 Mpa to the brake control electromagnetic valve control signal output circuit 49. The brake control electromagnetic valve control signal output circuit 49 outputs a brake control electromagnetic output signal having a set pilot pressure of 3 Mpa to the brake control electromagnetic valve 6.

This causes the brake control electromagnetic valve 6 to exert a pilot pressure of 3 Mpa onto the brake valve 2 to operate the work braking device. For this reason, it is no more necessary for the operator to operate the brake switch 25 in order to operate the work braking device upon completion of traveling to start the work, thus avoiding troublesome operations.

Note that if the operation of the brake pedal 1 is discontinued during timing by the timer, the timer is reset (14*f*) and thereafter, if the brake pedal 1 is depressed to a maximal extent, the timer is activated. When the rotation number N exceeds the predetermined value N1, counting by the timer is stopped (14*e*) and when it becomes equal to or greater than the predetermined value N2, the timer is reset (14*d*). Also, when the change-over switch 24 is turned off, the timer is reset (14*c*). When the brake switch 25 is changed over to a position other than the off position and returned to the off position again, the control of the brake lock per se is reset.

When the brake is locked by the processing of the brake lock determination circuit 14 (14*h*), the unlock determination circuit 13, which determines whether to unlock the brake in its locked state, outputs a signal indicating that the brake lock state is maintained (brake on signal) and a signal indicating that a brake lock state is unlocked (brake off signal) (13*a*) to (13*f*). In the brake lock state (14*h*) as determined by the brake lock determination circuit 14, the brake flag A is off, so that the signal with its brake flag A being off enters the unlock determination circuit 13. If no brake unlock action, that is, no depression operation of the pedal 1 to a maximal extent has been taken, the proximity switch 23 is turned off and a brake on signal is output, so that the lock state of the brake is maintained and the brake flag A is turned on (13*a*). Then, when the brake pedal 1 is depressed to a maximal extent in order to unlock the brake, the proximity switch 23 is turned on. Then, if the change-over switch 24 is on, the timer is activated (13*e*) and after a predetermined time is measured, a brake off signal is output and the brake flag A is turned off (13*f*).

This causes the switch of the change-over circuit 15 to be changed over to the position b and a brake release signal is output from the output circuit 17 of the controller 10. Therefore, a brake control pilot pressure signal having a set pilot pressure of 0 Mpa is output from the output circuit 45 through the change-over circuit 46. As mentioned above, the work brake operation determination circuit 41 is in a state where it outputs an off signal and hence a brake control pilot pressure signal having a set pilot pressure of 0 Mpa is output from the output circuit 43 through the change-over circuit 47. Therefore, the Max determination circuit 48 outputs a brake control pilot pressure signal having a set pilot pressure of 0 Mpa to the brake control electromagnetic valve control signal output circuit 49. The brake control electromagnetic valve control signal output circuit 49 outputs a brake control electromagnetic valve output signal having a set pilot pressure of 0 Mpa to the brake control electromagnetic valve 6.

As a result, the brake control electromagnetic valve 6 is changed over to the position B, so that the brake lock is unlocked. For this reason, it is no longer necessary for the operator to operate the brake switch 25 in order to unlock the operation of the work braking device upon completion of the work and starting the traveling, thus avoiding troublesome operations. Even if the change-over switch 24 is turned off, a brake off signal is output and the brake flag A is turned off (13*c*).

Note that if the operation of the brake pedal 1 is discontinued during the timing by the timer, the timer is reset (13*d*). Thereafter, if the brake pedal 1 is depressed to a maximal extent, the proximity switch 23 is turned on to activate the timer. When the brake switch 25 is changed over to a position other than the off position and returned to the off position again, the control of the brake lock per se is reset.

When the brake lock determination circuit 14 determines that a brake locked state is established by the operation of the brake pedal 1 (14*h*, brake flag A being off), and if the depressing of the brake pedal 1 is continued as it is in this state, it is determined by the unlock determination circuit 13 that the brake flag A is off and the proximity switch 23 is on. In this case, the unlock determination circuit 13 outputs a brake on signal so that the brake lock state can be continued and the brake flag A is turned off (13*b*), thus preventing the brake lock from being unlocked. In this state, when the operation of the brake pedal 1 is stopped, since the brake flag A is off and the proximity switch 23 is off, the unlock determination circuit 13 outputs a brake on signal and the brake flag A is turned on (13*a*), thus unlock determination being performed as mentioned above while maintaining the brake lock state.

When it is determined by the unlock determination circuit 13 that the brake is in an unlocked state by the operation of the brake pedal 1 (13*f*, the brake flag A being off), and if the depressing of the brake pedal 1 is continued as it is in this state, the brake lock determination circuit 14 determines that the brake flag A is off and the brake operation pressure PB is equal to or higher than the predetermined value PB1. In this case, the brake lock determination circuit 14 outputs a brake off signal so that the brake unlock state can be continued and turns the brake flag A off (14*b*) so that the brake can be prevented from being locked. In this state, when the operation of the brake pedal 1 is stopped, it is determined again by the brake lock determination circuit 14 that the brake flag A is off and the brake operation pressure PB is below the predetermined value PB1, so that a brake off signal is output and the brake flag A is turned on (14*a*), thus lock determination being performed as mentioned above while maintaining the brake unlock state.

When the work brake by automatic control of the work braking device mentioned above is not on, since the brake flag B is off in its initial state as mentioned above, if the hand switch 26 is operated and the accelerator pedal 64 is not operated (41*b*), an on signal is output from the work brake operation determination circuit 41 and the brake flag B is turned on. As a result, a brake control pilot pressure signal for controlling the pilot pressure to a set pilot pressure according to the vehicle speed of the work vehicle is output from the output circuit 42 through the change-over circuit 47. As mentioned above, since the work brake by automatic control by the work braking device is off, a brake control pilot pressure signal having a set pilot pressure of 0 Mpa is output from the output circuit 45 through the change-over circuit 46. Therefore, the Max determination circuit 48 outputs a brake control pilot pressure signal for controlling the pilot pressure to the set pilot pressure according to the vehicle speed of the work vehicle to the brake control electromagnetic valve control signal output circuit 49. The brake control electromagnetic valve control signal output circuit 49 outputs a brake control electromagnetic output signal for controlling the pilot pressure to the set pilot pressure according to the vehicle speed of the work vehicle to the brake control electromagnetic valve 6.

This causes the brake control electromagnetic valve 6 to exert the pilot pressure according to the vehicle speed of the work vehicle onto the brake valve 2, so that the work vehicle can be braked with a braking force according to the vehicle speed of the work vehicle. Note that at least when the work vehicle is at a stop, the service brake is hydraulically locked.

Note that when the work brake by automatic control of the work braking device mentioned above is not on and the accelerator pedal 64 has been operated (41*c*), even if the hand switch 26 is operated, an off signal is output from the work brake operation determination circuit 41 and the brake flag B remains off. That is, if the accelerator pedal 64 is operated, an input by the operation of the hand switch 26 is invalidated. As a result, a brake control pilot pressure signal having a set pilot pressure of 0 Mpa is output from the output circuit 43 through the change-over circuit 47. As mentioned above, the work brake by automatic control of the work braking device is not on, so that a brake control pilot pressure signal having a set pilot pressure of 0 Mpa is output from the output circuit 45 through the change-over circuit 46. Therefore, the Max determination circuit 48 outputs a brake control pilot pressure signal having a set pilot pressure of 0 Mpa to the brake control electromagnetic valve control signal output circuit 49. The brake control electromagnetic valve control signal output circuit 49 outputs a brake control electromagnetic valve output signal, which controls the set pilot pressure to 0 Mpa, to the brake control electromagnetic valve 6.

This leaves the brake control electromagnetic valve 6 to be changed over to the position B. As a result, the brake valve 2 is maintained as being changed over to the position B, so that the work braking device is not actuated.

In a state where the work brake is on by the operation of the hand switch 26, the brake flag B is turned on. This results in that as shown in FIG. 4, when cancellation of the operation of the work braking device is to be determined, the on/off state of the hand switch 26 is not determined. That is, in a state where the work brake is on by the operation of the hand switch 26, the input by the operation of the hand switch 26 is invalidated. Then, determination of cancellation of the operation of the work braking device is performed according to the on/off state of the proximity switch 23.

In the state where the work brake is on by the operation of the hand switch 26, if the brake pedal 1 is not depressed to a maximal extent (41*d*), an on signal is output from the work brake operation determination circuit 41 and the brake flag B is left to be on. This causes the brake control electromagnetic valve 6 to exert a pilot pressure according to the vehicle speed of the work vehicle onto the brake valve 2, so that a braking force according to the vehicle speed of the work vehicle is applied to brake the work vehicle.

When the brake pedal 1 is depressed to a maximal extent in the state where the work brake is on by the operation of the hand switch 26 (41*e*), an off signal is output from the work brake operation determination circuit 41 and the brake flag B is turned off. As a result, as mentioned above, a brake control pilot pressure signal having a set pilot pressure of 0 Mpa is output from the output circuit 43 through the change-over circuit 47, so that the operation of the work braking device is canceled as mentioned above.

According to the embodiments mentioned above, the following effects are exhibited.

(1) The work braking device is configured such that it is activated by operating the hand switch 26 that is attached to the operating lever 63 and that it is inactivated when the brake pedal is depressed to a maximal extent. As a result, in the case of works in which working such as excavation and traveling are alternately repeated frequently, the operator need not remove his or her hand from the operating lever before he or she can operate the brake switch 25 or the operator need not depress the brake pedal 1 deeper than otherwise in order to actuate the work braking device. Also, during the work such as excavation, the operator need not continue depressing the brake pedal 1 in order to prevent the work vehicle from moving. Therefore, the work braking device can be activated and inactivated without difficulty, so that the operability of the work vehicle when working such as excavation and traveling are alternately repeated frequently can be increased.

(2) The work braking device is configured such that in the state where it is actuated by the operation of the hand switch 26, the input by the operation of the hand switch 26 is invalidated so that the work braking device cannot be inactivated by the operation of the hand switch 26. As a result, even if the operator operates the hand switch 26 unintentionally while the work braking device is engaged in operation by the operation of the hand switch 26, the inactivation of the work braking device contrary to the operator's intention is not effected, so that moving of the work vehicle that is not intended by the operator is prevented.

(3) The work braking device is configured such that in the state where it is activated by the operation of the hand switch 26, it will not be inactivated unless the brake pedal 1 is depressed to a maximal extent. As a result, in order to inactivate the work braking device, the operator must intentionally depress the brake pedal 1 deeply. Therefore, according to the invention, the inactivation of the work braking device contrary to the operator's intention is not effected, so that the work vehicle can be prevented from moving that is not intended by the operator. By making the inactivation operation of the work braking device in case that the work braking device is activated by the operation of the hand switch 26 the same as the automatic control of the work braking device by the operation of depressing the brake pedal 1, the inactivation operation of the work braking device is unified, so that the operability of the device increases.

(4) The work braking device is configured such that when the accelerator pedal 64 is operated, the work braking device is prevented from being activated by the operation of the hand switch 26. As a result, even if the operator unintentionally operates the hand switch 26 during traveling of the work vehicle, the work braking device is not activated contrary to the intention of the operator, so that a reduction in speed of the work vehicle that is not intended by the operator while it is traveling can be prevented.

(5) The work braking device is configured such that when the accelerator pedal 64 is not operated, a braking force according to the vehicle speed is generated by the operation of the hand switch 26. With this configuration, even if the operator performs an operation for activating the work braking device (i.e., operates the hand switch 26) in a state that the work vehicle is not completely stopped, the work vehicle does not come to a sudden stop, so that an impact shock due to an abrupt stop of the work vehicle can be inhibited.

Variation Examples (1) Although no particular reference has been made in the above explanations, a pilot lamp may be connected to the controller 10 so that it can be put on/off according to a brake operation signal that is output through the change-over circuit 15 or an on signal that is output from the work brake operation determination circuit 41. This allows the operator to recognize the state of hydraulic lock.

(2) In the above explanations, the work braking device is configured such that the spool position of the electromagnetic valve 6 is shifted based on a signal from the controller 10 to deliver a pilot pressure to the brake valve 2, so that the pressure oil from the gear pump 3 can work at the brake cylinders 4 and 5. However, the configurations of the control unit (controller 10), the hydraulic brake device, and the brake lock unit may be any desired ones as far as the hydraulic brake device is hydraulically locked when the operation of the hand switch 26 is detected and the hydraulic lock of the hydraulic brake device is unlocked when the predetermined depression operation (for example, depression to a maximal extent) of the brake pedal 1 is detected. In this case, the predetermined depression operation may be an operation other than the operation of depression to a maximal extent.

(3) Regarding the condition for unlocking the hydraulic lock activated by the operation of the hand switch 26, there is adopted a configuration such that the maximal depression operation of the brake pedal 1 is detected according to the on/off of the proximity switch 23. However, the configuration of a brake pedal operation detection unit is not limited thereto. For example, the maximal depression operation of the brake pedal 1 may be detected based on the operation pressure PB of the brake pedal 1 that is detected by the pressure sensor 22. Also, there is adopted a configuration such that the operation of the accelerator pedal 64 is detected by detecting the pilot pressure PA according to the amount of operation of the accelerator pedal 64. However, the configuration of an accelerator pedal operation detection unit is not limited thereto. There is adopted a configuration such that the vehicle speed is detected by detecting the rotation number N of the transmission. However, the configuration of a vehicle speed detection unit is not limited thereto. There is adopted a configuration such that the mode of the hydraulic brake device can be changed over between an automatic lock mode in which the hydraulic brake device is automatically locked and a manual lock mode in which the automatic lock mode of the hydraulic brake device is canceled by change-over of the change-over switch 24. However, a mode change-over unit other than the change-over switch may also be used.

(4) In the above explanation, a wheeled excavator is explained as an example of the work vehicle. However, the present invention is not limited thereto and may be applied to other work vehicles.

(5) The above mentioned embodiments and variation examples thereof may be combined in any combinations.

Note that the present invention is not limited to the above mentioned embodiments and may include control devices of work vehicles of various structures as far as each of them comprises a hydraulic brake device that generates a braking force according to an operation of a brake pedal upon traveling; a brake lock unit that hydraulically locks the hydraulic brake device and unlocks the hydraulic lock of the hydraulic brake device; a brake pedal operation detection unit that detects operation of the brake pedal; a hydraulic lock directing switch that is provided on a manual operating lever for operating a work device of the work vehicle; and a control unit that controls the brake lock unit such that when the hydraulic lock directing switch is operated, the hydraulic brake device is hydraulically locked and when a predetermined depression operation (hereafter, referred to as "set depression operation") of the brake pedal is detected, the hydraulic lock of the hydraulic brake device is unlocked.

The disclosure of the following priority application is herein incorporated by reference: Japanese Patent Application No. 2012-009248 (filed on Jan. 19, 2012).

The invention claimed is:

1. A control device for a work vehicle, comprising:
a hydraulic brake device that generates a braking force according to an operation of a brake pedal upon traveling;
a brake lock device that hydraulically locks the hydraulic brake device and unlocks a hydraulic lock of the hydraulic brake device;
a brake pedal operation detection unit that detects the operation of the brake pedal;
a hydraulic lock directing switch that is provided on a manual operating lever for operating a work device of the work vehicle; and
a control unit that controls the brake lock device such that when the hydraulic lock directing switch is operated, the hydraulic brake device is hydraulically locked and when a predetermined depression operation of the brake pedal is detected by the brake pedal operation detection unit, the hydraulic lock of the hydraulic brake device is unlocked, wherein
the control unit controls the brake lock unit such that even when the hydraulic lock directing switch is operated after the hydraulic brake device is hydraulically locked, the hydraulic lock of the hydraulic brake device is not unlocked.

2. A control device for a work vehicle, comprising:
a hydraulic brake device that generates a braking force according to an operation of a brake pedal upon traveling;
a brake lock device that hydraulically locks the hydraulic brake device and unlocks a hydraulic lock of the hydraulic brake device;
a brake pedal operation detection unit that detects the operation of the brake pedal;
a hydraulic lock directing switch that is provided on a manual operating lever for operating a work device of the work vehicle;
a control unit that controls the brake lock device such that when the hydraulic lock directing switch is operated, the hydraulic brake device is hydraulically locked and when a predetermined depression operation of the brake pedal is detected by the brake pedal operation detection unit, the hydraulic lock of the hydraulic brake device is unlocked; and
an accelerator pedal operation detection unit that detects operation of an accelerator pedal, wherein
the control unit invalidates operation of the hydraulic lock directing switch when the accelerator pedal operation detection unit detects that the accelerator pedal is operated.

3. The control device according to claim 2, further comprising:
a speed detection unit that detects a traveling speed of the work vehicle, wherein
when the hydraulic lock directing switch is operated, the control unit controls the brake lock unit such that a braking force generated by the hydraulic brake device becomes greater as the traveling speed detected by the speed detection unit becomes lower.

* * * * *